United States Patent [19]
Fukuhara

[11] Patent Number: 5,355,118
[45] Date of Patent: Oct. 11, 1994

[54] VEHICLE COLLISION ALERT SYSTEM

[75] Inventor: Hiroshige Fukuhara, Kanagawa, Japan

[73] Assignee: Nissan Motor Co., Ltd., Yokohama, Japan

[21] Appl. No.: 911,624

[22] Filed: Jul. 10, 1992

[30] Foreign Application Priority Data

Jul. 11, 1991 [JP] Japan .................................. 3-171380

[51] Int. Cl.$^5$ .................................................. B60Q 1/26
[52] U.S. Cl. ...................................... 340/435; 340/436; 340/903; 348/148
[58] Field of Search ................ 340/435, 436, 903; 364/460, 461; 358/103, 105

[56]  References Cited

U.S. PATENT DOCUMENTS

| | | | |
|---|---|---|---|
| 3,689,882 | 9/1972 | Dessailly | 340/903 |
| 4,095,666 | 6/1978 | Baba et al. | 364/461 X |
| 4,257,703 | 3/1981 | Goodrich | 358/105 X |
| 4,931,937 | 6/1990 | Kakinami et al. | 364/460 X |

FOREIGN PATENT DOCUMENTS

| | | | |
|---|---|---|---|
| 0022630 | 2/1979 | Japan | 340/104 |
| 0188582 | 10/1984 | Japan | 364/461 |
| 0208246 | 8/1989 | Japan | 340/435 |
| 2-10912 | 3/1990 | Japan | |

OTHER PUBLICATIONS

"Automobile Collision Avoidance Radar", Nissan Technical Journal, No. 18, 1982, pp. 106–112.

Primary Examiner—John K. Peng
Assistant Examiner—Tim Johnson
Attorney, Agent, or Firm—Foley & Lardner

[57]  ABSTRACT

An apparatus for deciding an excessive approach of a vehicle to an object in front of the vehicle. The excessive approach decision apparatus comprises a normalized time rate of change detector for determining a normalized time rate of change of a visual angle for the object as viewed from the vehicle. An excessive approach is indicated based upon the determined normalized time rate.

5 Claims, 6 Drawing Sheets

VEHICLE COLLISION ALERT SYSTEM

BACKGROUND OF THE INVENTION

This invention relates to an apparatus for deciding an excessive approach of an automotive vehicle to an object in front of the vehicle.

In an article entitled "Radar For Car Crash Prevention", Nissan Technical Journal, No. 18, 1982, there is described a conventional excessive approach decision apparatus which utilizes a safety distance Rs (in meters) calculated as $$Rs = \frac{Vr(2Va - Vr)}{2\alpha} + Va\, Td + K \quad (1)$$

where Vr (in meters per seconds) is the speed of the vehicle with respect to the one in front, Va (in meters per seconds) is the speed of the vehicle on which the radar is installed, Td (in seconds) is the driver's response time, K (in meters) is the distance between the vehicles when the application of braking to the vehicle is completed, and $\alpha$ is the deceleration (g). Equation (1) represents the condition where the vehicle can come to a safety stop with a distance K spaced away from the vehicle in front when both of the vehicles are decelerated at an acceleration of $\alpha$.

Figure 10:
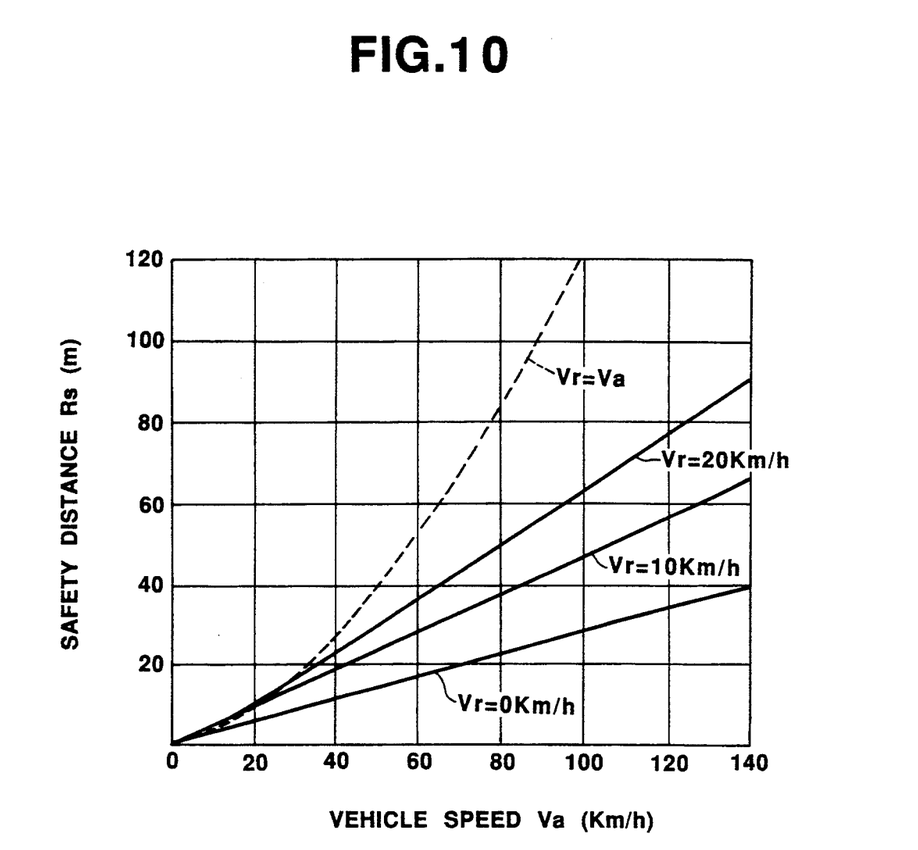
FIG. 10 is a graph of safety distance versus vehicle speed.

FIG. 10 is a graph of safety distance Rs versus vehicle speed Va. The broken curve indicates the safety distance Rs with respect to the vehicle speed Va when Vr=Va, that is, the vehicle in front is at rest. In order to prevent a pile-up, i t is required to retain the safety distance Rs indicated by the broken curve. Therefore, it is the conventional practice to produce an alarm when the distance of the vehicle away from the vehicle in front is equal to or less than the safety distance calculated from Equation (1).

Since such a conventional excessive approach decision apparatus decides an excessive approach based upon the distance Rs which permits the vehicle to come to a stop with no collision with the vehicle held at rest in front of the vehicle, however, it is very difficult, if not impossible, to produce the alarm in agreement with the driver's sense for an excessive approach without annoying the driver.

SUMMARY OF THE INVENTION

A main object of the invention is to provide an improved excessive approach decision apparatus which can decide an excessive approach in agreement with the driver's sense.

There is provided, in accordance with the invention, an apparatus for deciding an excessive approach of a vehicle to an object in front of the vehicle. The excessive approach decision apparatus comprises a normalized time rate of change detector for determining a normalized time rate of change of a visual angle for the object as viewed from the vehicle, and an indicator for producing an indication of the excessive approach based upon the normalized time rate.

BRIEF DESCRIPTION OF THE DRAWINGS

This invention will be described in greater detail by reference to the following description taken in connection with the accompanying drawings, in which.

DETAILED DESCRIPTION OF THE INVENTION

Prior to the description of the preferred embodiments of the invention, the fundamentals of the invention are described in order to provide a basis for a better understanding of the invention. The invention is based upon the unexpected discovery that the driver's sense or recognition of an excessive approach of his vehicle to an object in front of his vehicle corresponds to the normalized value $(d\theta/dt)\cdot(1/\theta)$ of the time rate of change $(d\theta/dt)$ of the visual angle $\theta$ for the object as viewed from his vehicle.

Figure 1:
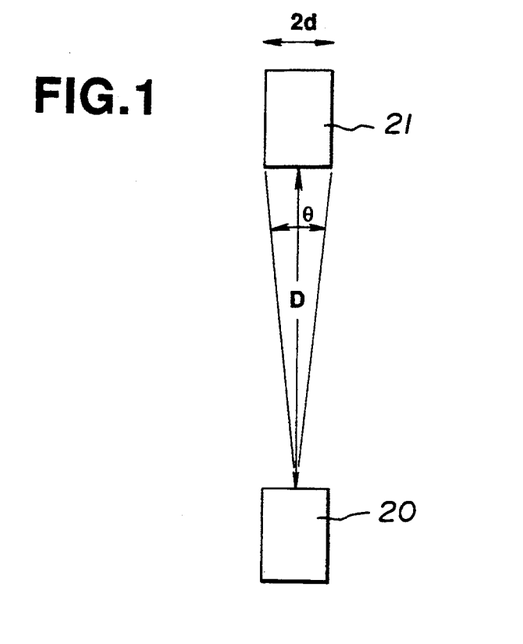
FIG. 1 is a diagram used in explaining the principles of the invention.

Referring to FIG. 1, it is now assumed that a driver is driving his vehicle 20 with a distance D (in meters) observed between his vehicle 20 and the vehicle 21 in front, as shown in FIG. 1. The vehicle 21 has a width 2 d (in meters). The visual angle $\theta$ for the vehicle 21 as viewed from the vehicle 20 is expressed as $$\theta = 2\tan^{-1}(d/D)(\text{rad}) \quad (2)$$

The time rate of change $(d\theta/dt)$ of the visual angle $\theta$ is given as $$\frac{d\theta}{dt} = \frac{d}{dD} 2\tan^{-1}\left(\frac{d}{D}\right)\frac{dD}{dt} = \frac{-2d}{D^2 + d^2} \frac{dD}{dt} \quad (3)$$

Substituting $(d/D)=x$ into Equation (3), we obtain $$\frac{d}{dD} 2\tan^{-1}x = \quad (4)$$

$$\frac{2}{1+x^2} \frac{dx}{dD} = \frac{2}{1+(d/D)^2}\left(-\frac{d}{D^2}\right) = \frac{-2d}{D^2 + d^2}$$

Substituting Vr for the relative speed dD/dt, we obtain $$\frac{d\theta}{dt} = \frac{2d}{D^2 + d^2} Vr \quad (5)$$

The relative speed Vr (in meters per seconds) has a positive sign when the vehicle 20 approaches to the vehicle 21 in front. The time rate of change $(d\theta/dt)$ of the visual angle $\theta$ is normalized by dividing Equation (5) by $\theta$. The normalized time rate of change of the visual angle, that is, the percentage of the time rate of change $(d\theta/dt)$ with respective to the visual angle $\theta$ is given as $$\frac{1}{\theta} \frac{d\theta}{dt} = \frac{d}{(D^2 + d^2)\tan^{-1}(d/D)} Vr \times 100(\%) \quad (6)$$

Since $\tan^{-1}(d/D)$ is expressed in a series, Equation (6) may be rewritten as $$\frac{1}{\theta} \frac{d\theta}{dt} = \frac{d}{(D^2 + d^2)\left[\frac{d}{D} - \frac{1}{3}\left(\frac{d}{D}\right)^3 + \frac{1}{5}\left(\frac{d}{D}\right)^5 - \frac{1}{7}\left(\frac{d}{D}\right)^7 \cdots\right]} Vr \quad (7)$$

$$= \frac{\frac{d}{D^2}}{[1 + (d/D)^2]\frac{d}{D}\left[1 - \frac{1}{3}\left(\frac{d}{D}\right)^2 + \frac{1}{5}\left(\frac{d}{D}\right)^4 - \frac{1}{7}\left(\frac{d}{D}\right)^6 \cdots\right]}$$

Since the vehicle width 2 d is about 2.5 meters at most and the minimum distance D between the vehicles 20 and 21 is 5 meters, the value $(d/D)^2$ is as small as 0.0622. Thus, Equation (7) may be rewritten with the values $(d/D)$ of the second and higher orders being neglected.

$$\frac{1}{\theta} \frac{d\theta}{dt} \approx \frac{\frac{d}{D^2}}{\frac{d}{D}} Vr = \frac{Vr}{D} \quad (8)$$

As can be seen from Equation (8), the normalized time rate $(1/\theta)\cdot(d\theta/dt)$ of change of the visual angle for the vehicle 21 running ahead of the vehicle 20 may be expressed as a function of the speed Vr of the vehicle 20 with respect to the vehicle 21 and the distance D of the vehicle 21 with respect to the vehicle 20. This means that the normalized time rate of change of the visual angle is regardless of the width 2 d of the vehicle 21 in front.

Tests were conducted to confirm the fact that the normalized time rate of change of the visual angle for the vehicle in front as viewed from the driver's vehicle is a factor contributing to the driver's recognition of an excessive approach to the vehicle in front. A driver received instructions to drive his vehicle at 100 km/h with a desired distance observed between his vehicle and the vehicle running ahead of his vehicle on a straight road having no vehicle other than these two vehicles. At a certain time, engine braking was applied to decelerate the vehicle in front to 80 km/h. There was no indication to the driver when the engine braking is initiated since the brake lamp does not go on in the presence of engine braking. The accelerator position signal was monitored to detect the time at which the driver released the accelerator pedal. The signal fed from the brake switch was monitored to detect the time at which the driver depressed the brake pedal. When the driver released the accelerator pedal, the distance D of his vehicle away from the vehicle in front and also the speed Vr of his vehicle with respect to the vehicle in front were measured to calculate the normalized time rate $(1/\theta)\cdot(d\theta/dt)$, that is, the ratio (%) of the time rate of change $(d\theta/dt)$ of the visual angle $\theta$ to the visual angle $\theta$. Similar tests were repeated for a number of drivers having different practical experiences in driving.

Figure 2:
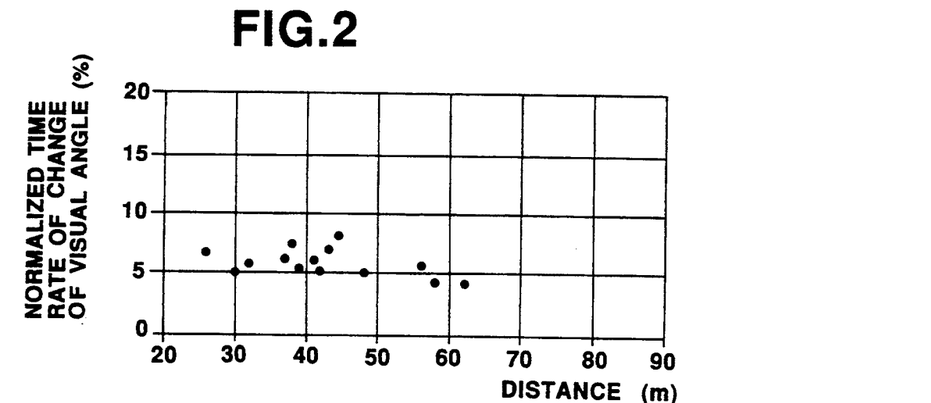
FIG. 2 is a graph plotting the normalized time rate with respect to the distance between the vehicles.

FIG. 2 is a graph plotting the normalized time rate $(1/\theta)\cdot(d\theta/dt)$ with respect to the distance D measured when the driver released the accelerator pedal. The average value and the standard deviation were 5.86% and 11.3%, respectively, which were substantially constant regardless of the distance D.

The driver's behavior made to release the accelerator pedal when his vehicle is following the vehicle in front at the vehicle speed of 100 km/h indicates that the driver noticed the deceleration of the vehicle in front and become convinced of an excessive approach to the vehicle in front. The driver would depress the brake pedal in a very high degree of probability. In addition, the fact that the normalized time rate $(1/\theta)\cdot(d\theta.dt)$ is substantially constant regardless of the distance D indicates that the normalized time rate is the factor contributing to the driver's recognition of an excessive approach to the vehicle in front.

The driver's behavior made to depress the brake pedal to decelerate his vehicle indicates his conviction of an excessive approach to the vehicle in front. Since the relative speed Vr measured in the tests when the driver released the accelerator pedal was as low as 3 to 13 m/s, it is not clear whether or not the driver actually decelerated his vehicle. For this reason, additional tests were conducted. A driver received instructions to drive his vehicle at 120 km/h behind the vehicle running at a constant speed of 80 km/h. The distance D and the relative speed Vr were measured when the driver depressed the brake pedal.

Figure 3:
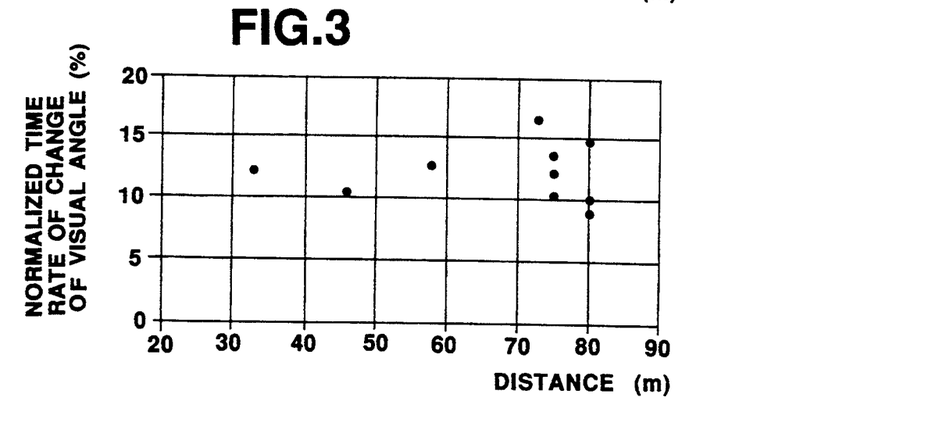
FIG. 3 is a graph plotting the normalized time rate with respect to the distance between the vehicles.

FIG. 3 is a graph plotting the normalized time rate $(1/\theta)\cdot(d\theta/dt)$ with respect to the distance D measured when the driver depressed the accelerator pedal. The average value and the standard deviation were 12% and 2.2%, respectively, which were substantially constant regardless of the distance D.

Two conditions are derived from these test results. The first condition, which occurs when the normalized time rate $(1/\theta)\cdot(d\theta/dt)$ exceeds about 6% ($0.06\pm0.011$), indicates a belief of an excessive approach of his vehicle to the decelerated vehicle in front. The second condition, which occurs when the normalized time rate $(1/\theta)\cdot(d\theta/dt)$ exceeds about 12% ($0.12\pm0.022$), indicates the danger of a rear-end collision and requires the driver to depress the brake pedal so as to decelerate his vehicle.

Figure 4:
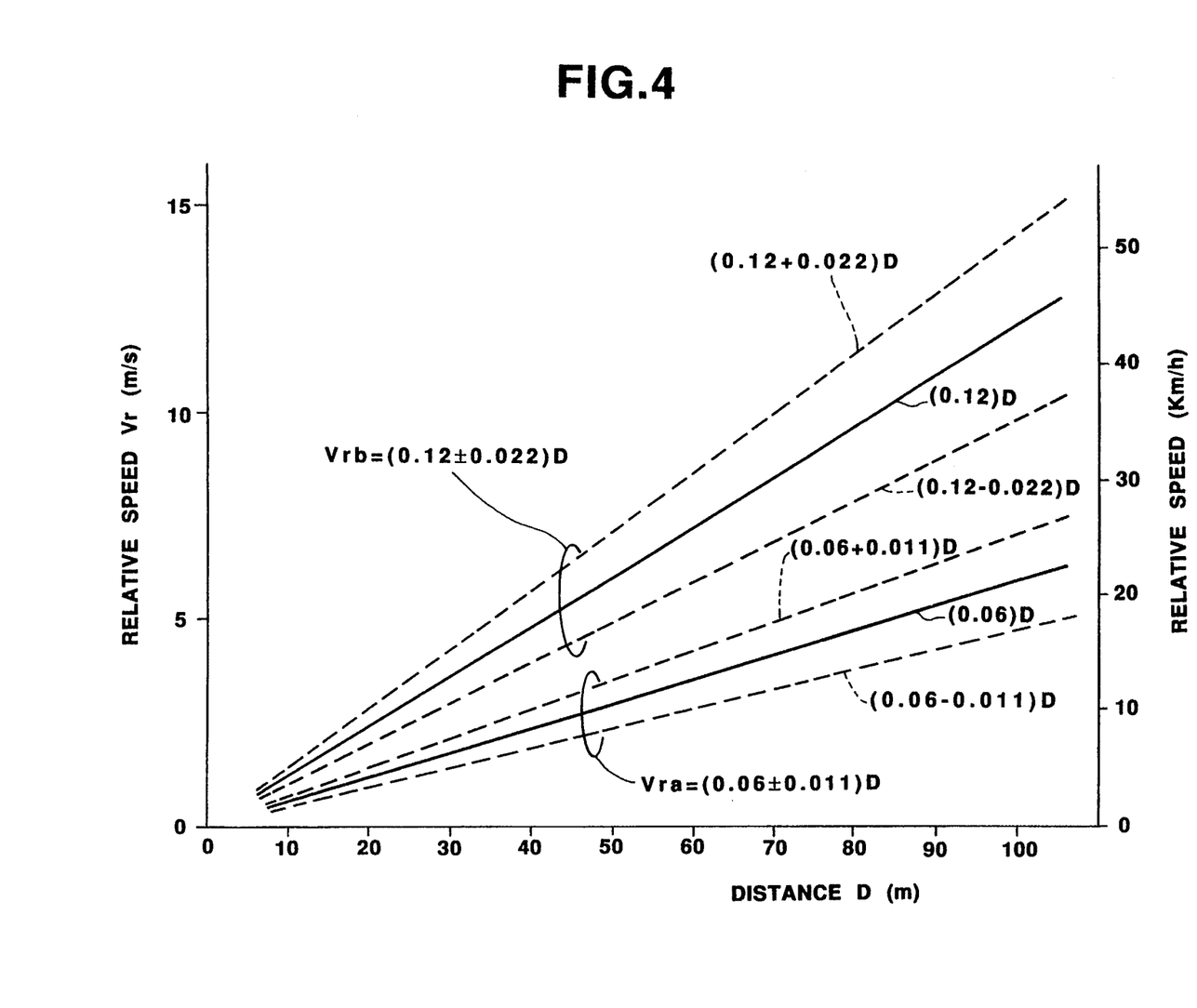
FIG. 4 is a graph of relative speed versus distance.

FIG. 4 is a graph showing the relationship between the distance D and the relative speed Vr. In FIG. 4, the lines Vra=($0.06\pm0.011$)D indicate the relative speed with respect to the distance D for the first condition. The lines Vra=($0.12\pm0.022$) indicate the relative speed with respect to the distance D for the second condition. These lines are obtained from Equation (8). Since the values Vra and Vrb correspond to the driver's sense or recognition of an excessive approach of his vehicle to the vehicle in front, it is possible to determine the first or second condition based upon the values Vra and Vrb.

Figure 5:
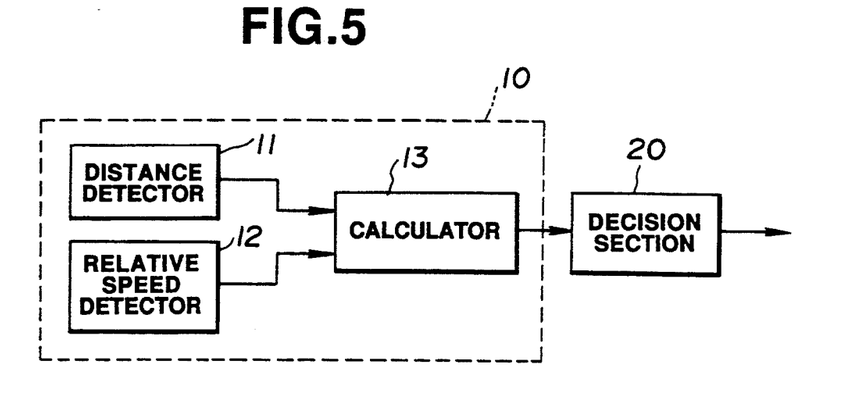
FIG. 5 is a schematic block diagram showing one embodiment of an excessive approach decision apparatus made in accordance with the invention.

Referring to FIG. 5, there is shown a schematic block diagram of an excessive approach decision apparatus embodying the invention. The excessive approach decision apparatus, which is installed on an automotive vehicle, includes a normalized time rate of change detector 10 for calculating the normalized time rate $(1/\theta)\cdot(d\theta/dt)$ of change of the visual angle $\theta$ for an object (the vehicle in front) as viewed from the vehicle. The normalized time rate of change detector 10 includes a distance detecting section 11 for detecting the distance D of the vehicle with respect to the vehicle in front. The distance detecting section 11 may be taken in the form of a radar installed on the vehicle for measuring the distance D between the vehicles. The normalized time rate of change detector 10 also includes a relative speed detecting section 12 for detecting the speed Vr of the vehicle with respect to the vehicle in front. The relative speed detecting section 12 may be taken in the form of a circuit for calculating the relative speed Vr by differentiating the measured distance D. These sections 11 and 12 may be a single section which employs an FM-CW radar disclosed in Japanese Patent Publication No. 2-10912, a pulse radar or the like. The information on the detected distance D and relative speed Vr are fed from the sections 11 and 12 to a calculating section 13 which calculates the normalized time rate $(1/\theta)\cdot(d\theta/dt)$ of change of the visual angle $\theta$ for the vehicle in front as viewed from the vehicle. This calculation is made from Equation (8) which specifies the normalized time rate as a function of distance D and relative speed Vr.

The excessive approach decision apparatus also includes a decision section 20 for making a decision as to whether the first or second condition occurs. This decision is made based upon the normalized time rate $(1/\theta)\cdot(d\theta/dt)$ calculated in the calculating section 13. For this purpose, the decision section 20 receives the information on the normalized time rate $(1/\theta)\cdot(d\theta/dt)$ from the calculating section 13 and compares the normalized time rate with first and second predetermined values. The decision section 20 produces a first command to indicate that the first condition occurs when the normalized time rate $(1/\theta)\cdot(d\theta/dt)$ exceeds the first predetermined value (for example, 6%) or exceeds a range of 6%±1.1%. That is, the first command indicates a recognition of an excessive approach of his vehicle to the vehicle in front. The decision section 20 produces a second command to indicate that the second condition occurs when the normalized time rate $(1/\theta)\cdot(d\theta/dt)$ exceeds the second predetermined value (for example, 12%) or exceeds a range of 12%±2.2%. That is, the second command indicates the danger of a rear-end collision.

Figure 6:
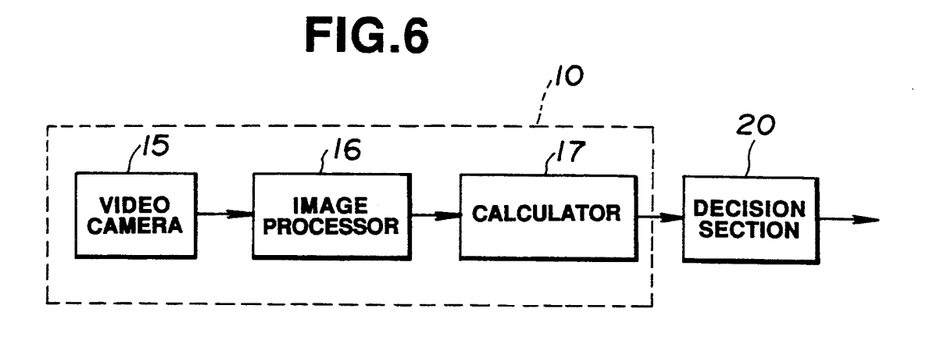
FIG. 6 is a schematic block diagram showing a second embodiment of the excessive approach decision apparatus of the invention.

Referring to FIG. 6, there is shown a second embodiment of the excessive approach decision apparatus of the invention. This embodiment is substantially the same as the first embodiment of FIG. 5 except for the arrangement of the normalized time rate of change detector 10. In this embodiment, the normalized time rate of change detector 10 includes a video camera 15, an image processor 16 and a calculating section 17. The video camera 15, which is mounted on the vehicle, is focused on the scene presented in front of the vehicle. The video signal is fed from the video camera 15 to an image processor 16 which processes it to calculate the percentage of the area of the image of the vehicle in front with respect to the whole image area occupied by the scene so as to detect the visual angle $\theta$. The calculating section 17 receives the information of the detected visual angle $\theta$ and calculates the normalized time rate $(1/\theta)\cdot(d\theta/dt)$ of change of the visual angle $\theta$. The decision section 20 receives the calculated result from the calculating section 17 and produces a first or second command substantially the same manner as described in connection with the first embodiment of FIG. 5.

Figure 7A:
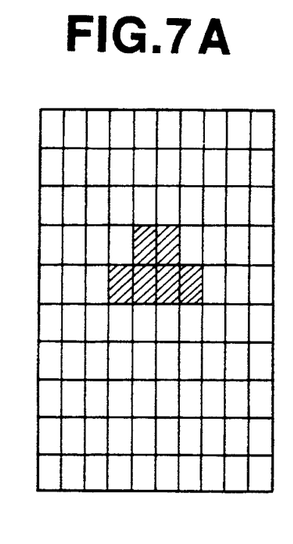
FIGS. 7A and 7B are diagrams showing a vehicle's image area change with time.
Figure 7B:
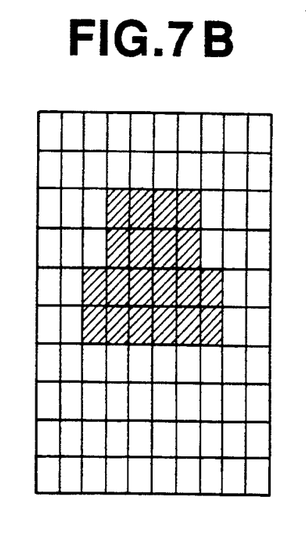

FIGS. 7A and 7B show two-dimensional images of the vehicle in front taken by the video camera 15 at different times A and B. The percentage of the area of the image with respect to the whole image area corresponds to the visual angle $\theta$ of the vehicle in front as viewed from the vehicle. If the distance D between the vehicles is great, the rate of change of the visual angle $\theta$ will be small even though the relative speed Vr is great. If the distance D between the vehicles is small, the rate of change of the visual angle $\theta$ will be great even though the relative speed Vr is small.

Figure 8:
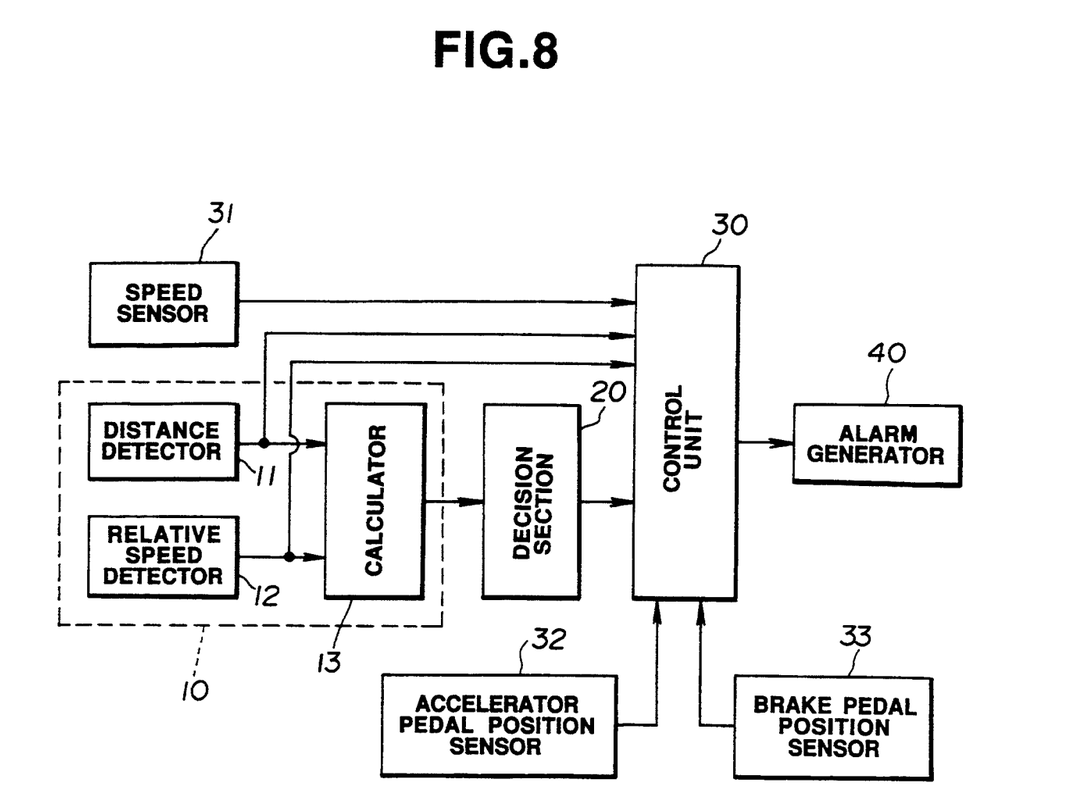
FIG. 8 is a schematic block diagram showing a third embodiment of the excessive approach decision apparatus of the invention.

Referring to FIG. 8, there is shown a third embodiment of the excessive approach decision apparatus of the invention. The excessive approach decision apparatus includes a normalized time rate of change detector 10 for calculating the normalized time rate $(1/\theta)\cdot(d\theta/dt)$ of change of the visual angle $\theta$. The normalized time rate of change detector 10 is substantially the same as described in connection with the first embodiment of FIG. 5. Alternatively, the normalized time rate of change detector 10 may be substantially the same as described in connection with the second embodiment of FIG. 6. The information on the normalized time rate $(1/\theta)\cdot(d\theta/dt)$ is fed from the normalized time rate of change detector 10 to a decision section 20 which produces a first command when the first condition occurs and a second command when the second condition occurs. The decision section 20 is substantially the same as described in connection with the first embodiment of FIG. 5.

The excessive approach decision apparatus also includes a control unit 30 which decides an excessive approach to the vehicle in front based upon various conditions of the vehicle that are sensed during its operation in addition to the command fed from the decision section 20. These sensed conditions include vehicle speed, accelerator pedal position, and brake pedal position. Thus, a vehicle speed sensor 31, an accelerator pedal position sensor 32 and a brake pedal position sensor 33 are connected to the control unit 30. The vehicle speed sensor 31, which is mounted for sensing the speed of running of the vehicle, produces an electrical signal indicative of the sensed vehicle speed Va. The accelerator pedal position sensor 32 is associated with the accelerator pedal of the vehicle for producing an electrical signal indicative of the degree to which the accelerator pedal is depressed. Alternatively, the accelerator pedal position sensor 32 may comprise an accelerator switch which is closed to supply current from the vehicle battery to the control unit 30 when the degree to which the accelerator pedal is depressed exceeds a predetermined value. The brake pedal position sensor 33, which is mounted for sensing the application of braking to the vehicle, produces an electrical signal indicative of the application of braking to the engine. The brake pedal position sensor 33 may be in the form of a G sensor for producing an electrical signal indicative of the degree of deceleration of the vehicle. Alternatively, the brake pedal position sensor 33 may comprise a brake switch associated with the brake pedal of the vehicle for closing to supply current from the vehicle battery to the control unit 30 in response to the application of braking to the vehicle. The control unit 30 produces a control signal causing an alarm generator 40 to provide a visual and/or audible alarm to indicate the danger of a rear-end collision. The alarm generator 40 may comprise a buzzer and/or lamp which goes on in response to the control signal from the control unit 30.

The control unit 30 may employ a digital computer which includes a central processing unit, a random access memory, a read only memory, and an input/output control circuit. The central processing unit communicates with the rest of the computer via a data bus. The read only memory contains the program for operating the central processing unit.

Figure 9:
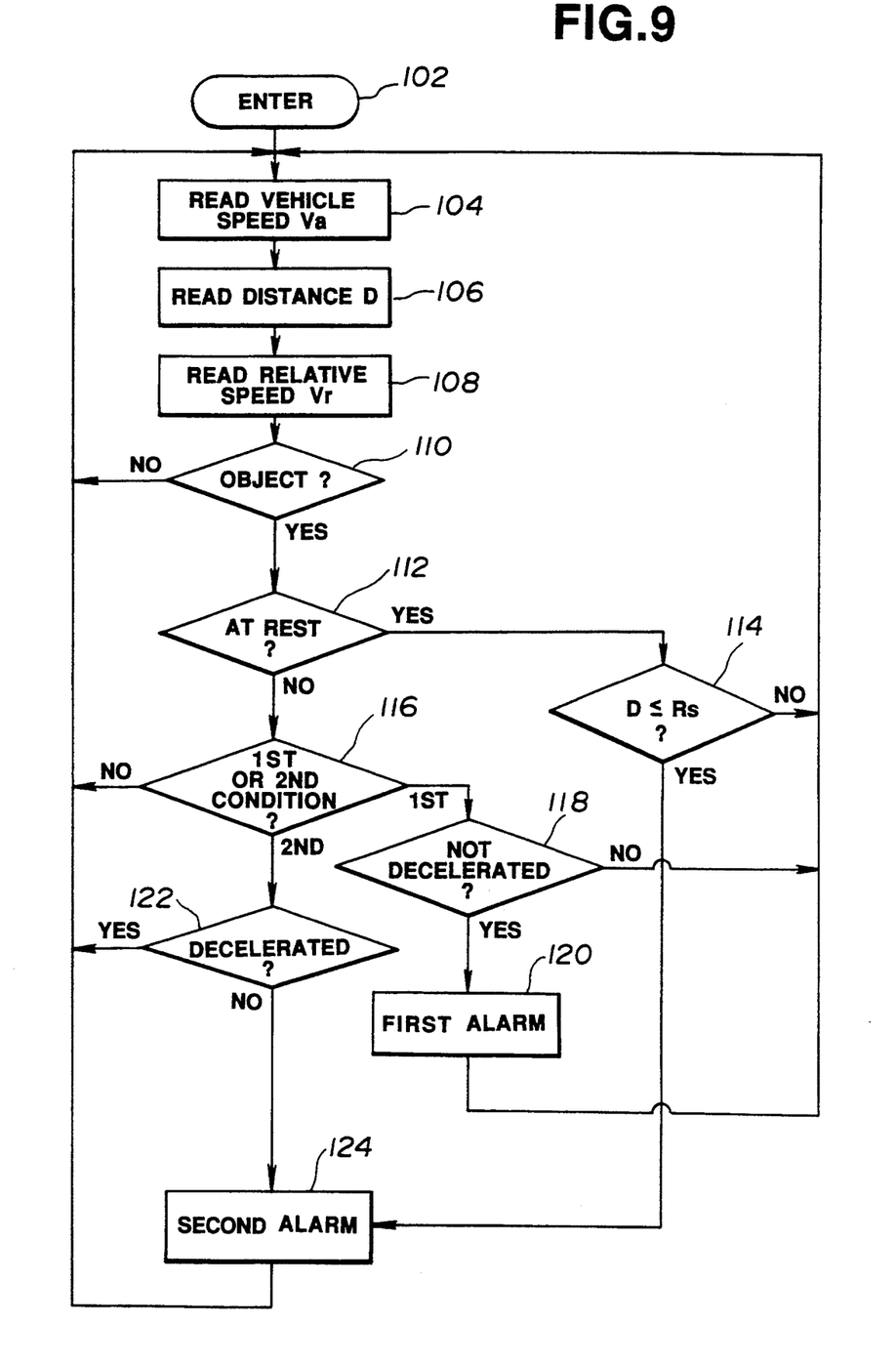
FIG. 9 is a flow diagram illustrating the programming of the digital computer used in the excessive approach decision apparatus.

FIG. 9 is a flow diagram illustrating the programming of the digital computer as it is used to produce a control signal to the alarm generator 40. The computer program is entered at the point 102. At the point 104 in the program, the vehicle speed Va is read into the computer memory. At the point 106 in the program, the distance D is read into the computer memory. At the point 108 in the program, the relative speed Vr is read into the computer memory. At the point 110 in the program, a determination is made as to whether or not any object (vehicle) exists in front of the vehicle. This determination is made based upon the distance D and relative speed Vr read at the respective points 106 and 108 If the answer to this question is "yes" then the program proceeds to the point 112. Otherwise, the program is returned to the point 104.

At the point 112 in the program, a determination is made whether or not the object is at rest. This determination is made based upon the vehicle speed Va and the relative speed Vr read at the respective points 104 and 108. If the answer to this question is "yes", then it means that the vehicle speed Va is equal to the relative speed Vr and the program proceeds to the point 114. Otherwise, the program proceeds to the point 116. At the point 114 in the program, a determination is made as to whether or not the distance D is equal to or less than a predetermined value Rs. The predetermined value Rs is calculated from Equation (1). If the answer to this question is "yes", then the program proceeds to the point 124 where the control unit 30 produces a control signal causing the alarm generator 40 to produces a second alarm so as to indicate the danger of a rear-end collision. Following this, the program is returned to the point 104. If the distance D is greater than the predetermined value Rs, then the program is returned from the point 114 to the point 104.

At the point 116 in the program, a determination is made as to whether or not the first or second command is produced from the decision section 20. If the first command is produced from the decision section 20, then the program proceeds to the point 118 where a determination is made as to whether or not the vehicle speed Va is unchanged or increased. This determination is made based upon the accelerator pedal position signal fed from the accelerator pedal position sensor 32 and the vehicle speed signal fed from the vehicle speed sensor 31. If the answer to this question is "yes" then it means that the driver does not recognize the excessive approach of his vehicle to the vehicle in front and the program proceeds to the point 120 where the control unit 30 produces a control signal causing the alarm generator 40 to provide a first alarm so as to indicate the first condition. Otherwise, the program is returned to the point 104.

In the presence of the second command, the program proceeds from the point 116 to the point 122 where a determination is made as to whether or not the vehicle is decelerated. This determination is made based upon the brake pedal position signal fed from the brake pedal position sensor 33 and the vehicle speed signal fed from the vehicle speed sensor 10. If the answer to this question is "yes", then the program is returned to the point 104. Otherwise, the program proceeds to the point 124 where the control unit 30 produces a control signal causing the alarm generator 40 to produce the second alarm so as to indicate the danger of a rear-end collision. Following this, the program is returned to the point 104.

Although the invention has been described in connection with the case where an alarm is provided to the driver when an excessive approach occurs, it is to be understood that the invention may be modified to automatically operate the accelerator pedal and/or the brake pedal to avoid a rear-end collision, for example, by replacing the step at the point 124 of FIG. 9 with a step of automatically decelerating the vehicle.

What is claimed is:

1. An apparatus for determining an excessive speed approach of a vehicle to an object in front of said vehicle, comprising:

a normalized time rate of change detector for determining a normalized time rate of change of a visual angle, $(1/\theta)\cdot(d\theta/dt)$, for said object as viewed from said vehicle, the normalized time rate of change detector including means for measuring a distance D of said vehicle with respect to said object, means for measuring a relative speed Vr of said vehicle with respect to said object, and means for dividing the measured relative speed Vr by the measured distance D to calculate the normalized time rate; and an indicator for producing an indication of the excessive speed approach based upon the normalized time rate, said indicator including means for producing a first alarm to indicate a recognition of an excessive approach of said vehicle to said object when the normalized time rate exceeds a first range of 6%±1.1%, said first range corresponding to a driver's recognition of an excessive approach of said vehicle, and for producing a second alarm indicating danger of a rear-end collision when the normalized time rate exceeds a second range of 12%±2.2%, said second range corresponding to a driver's recognition of danger of a rear-end collision.

2. The apparatus as claimed in claim 1, wherein said indicator includes means for producing a vehicle deceleration signal when said vehicle is decelerating, means responsive to the vehicle deceleration signal for preventing the first alarm from being produced, and means responsive to the vehicle deceleration signal for preventing the second alarm from being produced.

3. The apparatus as claimed in claim 1, wherein said indicator includes means for detecting the presence of said object based upon the measured distance D and relative speed Vr.

4. The apparatus as claimed in claim 3, further including means for measuring a speed of said vehicle and wherein said indicator includes means for detecting said object being at rest based upon the measured vehicle speed and relative speed.

5. The apparatus as claimed in claim 1, wherein said normalized time rate of change detector includes a video camera focused to a scene presented in front of said vehicle for producing a video signal, an image processor for processing the video signal to produce an image of the scene, said image processor including means for calculating a percentage of an area occupied by an image of said object with respect to a whole area occupied by the image of the scene so as to determine the normalized time rate.

* * * * *